(12) United States Patent
Tamura

(10) Patent No.: US 7,985,044 B2
(45) Date of Patent: Jul. 26, 2011

(54) HEAVY ARTICLE INVERSION DEVICE

(75) Inventor: Shigeki Tamura, Yashio (JP)

(73) Assignee: Denson Co., Ltd., Yashio-Shi, Saitama (JP)

( * ) Notice: Subject to any disclaimer, the term of this patent is extended or adjusted under 35 U.S.C. 154(b) by 343 days.

(21) Appl. No.: 12/373,665

(22) PCT Filed: Jul. 17, 2007

(86) PCT No.: PCT/JP2007/064061
§ 371 (c)(1),
(2), (4) Date: Feb. 13, 2009

(87) PCT Pub. No.: WO2008/010475
PCT Pub. Date: Jan. 24, 2008

(65) Prior Publication Data
US 2009/0290968 A1    Nov. 26, 2009

(30) Foreign Application Priority Data

Jul. 19, 2006  (JP) ................................. 2006-197376

(51) Int. Cl.
*B21B 39/24*    (2006.01)
*B65G 47/22*    (2006.01)
(52) U.S. Cl. .......................... 414/771; 414/783; 414/759
(58) Field of Classification Search .................. 108/147; 198/403; 248/133, 139; 414/412, 419, 421, 414/680, 754, 758–764, 767–768, 770–771, 414/774, 777–778
See application file for complete search history.

(56) References Cited

U.S. PATENT DOCUMENTS 591,712 A * 10/1897 Worth ............................ 198/403
(Continued)

FOREIGN PATENT DOCUMENTS

JP    5-330619 A    12/1993
(Continued)

OTHER PUBLICATIONS

Form PCT/ISA/210 (International Search Report) dated Sep. 11, 2004.

*Primary Examiner* — Gregory W Adams
(74) *Attorney, Agent, or Firm* — Buchanan Ingersoll & Rooney PC

(57) ABSTRACT

A heavy article inversion device is provided, in which the inverting operations may be performed in a short time by reducing the size of the heavy article inversion device comprising a pair of inversion boards that may be revolved about a common rotary shaft supported in the center of a base between the horizontal state and the angles of revolution of less than 180 degrees from the horizontal state, and a pair of cam plates each fixed to the corresponding one of the pair of inversion boards and having its proximal end side rotatably fixed to the common rotary shaft, in which each one of the pair of cam plates has a curved lower outer circumferential surface extending from the proximal end side toward the radial outside end and which may be engaged by the rod of each respective one of the pair of linear drive mechanisms when the rod is being moved out of and moved back into the corresponding cylinder of the respective liner drive mechanism, thereby causing the respective cam plate to be rotated about the common rotary shaft. In accordance with the present invention, the direction in which the rod of each one of pair of the linear drive mechanisms may be moved out of or moved back into the cylinder occurs from the obliquely downward direction toward the direction of the common rotary shaft.

2 Claims, 3 Drawing Sheets

U.S. PATENT DOCUMENTS

| | | | |
|---|---|---|---|
| 2,235,832 A * | 3/1941 | Freeman | 414/760 |
| 2,365,007 A * | 12/1944 | Rideout et al. | 414/421 |
| 2,928,558 A * | 3/1960 | Bamford et al. | 414/680 |
| 3,289,811 A * | 12/1966 | Kelley | 414/791.3 |
| 3,386,598 A * | 6/1968 | Ferko | 414/771 |
| 3,490,612 A * | 1/1970 | Werner et al. | 414/791.3 |
| 3,510,381 A * | 5/1970 | Hollingsworth | 156/313 |
| 3,812,982 A * | 5/1974 | Crandlemire | 414/771 |
| 3,829,072 A * | 8/1974 | Fieser et al. | 266/51 |

FOREIGN PATENT DOCUMENTS

| | | |
|---|---|---|
| JP | 2000-226113 A | 8/2000 |

\* cited by examiner

HEAVY ARTICLE INVERSION DEVICE

BACKGROUND

1. Technical Field

The present invention relates to a heavy article inversion device that is intended to invert a heavy article (such as a work or workpiece) with safety and stability by an angle of 180 degrees.

2. Background

As the device that permits a heavy article (which may be referred to hereinafter as a work or workpiece) to be inverted by an angle of 180 degrees, a heavy article inversion device is proposed by the applicant of the current patent application, wherein the device includes a pair of inversion boards that may be used to permit a work to be inverted by the angle of 180 degrees (see the Japanese patent application now published for the public examination under No. H5 (1993)-330619).

Another heavy article inversion device is also proposed by the same applicant of the current patent application, wherein the device includes a pair of inversion boards that may be revolved through the angle of at least 90 degrees by holding the article securely between the pair of inversion boards in order to avoid that the article will slip or drop from the pair of inversion boards during the revolution (see the Japanese patent application now published for the public examination under No. 2000-226113).

SUMMARY OF THE INVENTION

Generally, each of the heavy article inversion devices described in the respective documents cited above includes a base, a pair of inversion boards, a pair of cam plates, and a pair of linear drive mechanisms. The pair of inversion boards may be revolved about a common rotary shaft supported in the center of the base between the horizontal state and the angles of less than 180 degrees from the horizontal state. Each cam plate is mounted to the corresponding inversion board, and has its proximal end side rotatably fixed to the common rotary shaft and has the lower outer circumferential surface extending from the proximal end side toward the radial outside end that is formed like a curve. Each of the linear drive mechanisms includes a cylinder and a rod in which the rod may be operated to be moved out of or moved back into the cylinder, and the linear drive mechanisms are mounted on the radial outside end of the base so that they can face opposite each other across the common rotary shaft. With the rod being moved back into the cylinder, each linear drive mechanism may be operated to cause the tip end of the rod to engage the curved lower outer circumferential surface on the radial outside end of the cam plate when the corresponding inversion board is placed in its horizontal state. The rod may thus be moved out of or moved back into the cylinder with the tip end of the rod engaging the curved lower outer circumferential surface of the cam plate. In this way, the pair of inversion boards each fixed to the corresponding cam plate may be revolved between the respective horizontal state and the angles of revolution of above 90 degrees and less than 180 degrees, causing the corresponding cam plate to be revolved about the rotary shaft.

Although the devices disclosed in the above documents are practically used, and may provide the useful effects, they must still be improved with regard to the reduction in the size and the smooth and efficient revolution of the pair of inversion boards through the angle of 180 degrees.

In light of the above, the object of the present invention is to provide the heavy article inversion device of the type described in the above documents wherein the device has the reduced-size construction, and enables the pair of inversion boards to be revolved in the reduced time.

In order to achieve the above object, the present invention proposes to provide the heavy article inversion device which has the constructional and functional features that will be described below.

The heavy article inversion device according to the present invention includes a pair of inversion boards, a pair of cam plates, and a pair of linear drive mechanisms.

Specifically, the pair of inversion boards may be revolved about the common rotary shaft supported in the center of base between the horizontal state and the angles of revolution of less than 180 degrees from the horizontal state.

The pair of cam plates is mounted to the respective inversion board, in which each cam plate has its proximal end side rotatably mounted to the common rotary shaft, and has the lower outer circumferential surface extending from the proximal end side toward the radial outside end that is formed like a curve.

Each of the linear drive mechanisms includes a cylinder and a rod, and may be operated to cause the rod to be moved out of and moved back into the cylinder. The linear drive mechanisms are arranged on the radial outside end of the base so that they can face opposite each other across the common rotary shaft.

The pair of linear drive mechanisms may be operated to cause the respective moving part, that is, the rod in this case, to be moved linearly (that is, moved out of or moved back into the cylinder in the linear manner).

With the rod being moved back into the cylinder, the pair of linear drive mechanisms may be operated to cause the tip end of the respective rod to engage the curved lower outer circumferential surface on the radial outside end of the respective one of the pair of cam plates when the pair of inversion boards is placed in the respective horizontal state. The rod may thus be moved out of or moved back into the cylinder with the tip end of the rod engaging the curved lower outer circumferential surface of the cam plate.

This may cause the pair of cam plates to rotate about the common rotary shaft, causing the pair of inversion boards each fixed to the respective of the pair of cam plates to be revolved between the horizontal state and the angles of revolution of more than 90 degrees and less than 180 degrees from the horizontal state.

In accordance with the present invention, the heavy article inversion device may further include a pair of inversion board restoring drive mechanisms. Each of the inversion board restoring mechanisms has its tip end side fixed to the radial outside end of the respective inversion board, and has its proximal end side fixed to the radial outside end of the base.

The heavy article inversion device may be constructed as described above, and may be characterized in that the direction in which the pair of linear drive mechanisms causes the respective rod to be moved out of and moved back into the respective cylinder occurs from the obliquely downward direction toward the direction of the common rotary shaft.

In accordance with the heavy article inversion device of the present invention, the pair of linear drive mechanisms is mounted to the radial outside end of the base so that those linear drive mechanisms can face opposite each other across the common rotary shaft, and the respective rod can be moved out of or moved back from the respective cylinder from the obliquely downward direction toward the direction of the common rotary shaft.

As described above, the pair of linear drive mechanisms causes the respective rod to be moved out of and moved back to the respective cylinder with the tip end of the respective one of the pair of cam plates being made to engage the curved lower outer circumferential surface of the respective cam plate, thus permitting the pair of inversion boards each fixed to the respective cam plate to be revolved between the horizontal state and the angles of revolution of more than 90 degrees and less than 180 degrees from the horizontal state, thereby causing the respective cam plate to be rotated about the common rotary shaft supported in the center of the base.

It may be understood from the documents cited above that in the conventional heavy article inversion device on which the heavy article inversion device of the present invention is based, the pair of linear drive mechanisms is disposed on the same horizontal plane as the common rotary shaft, and the direction in which the respective rod is to be moved out of and moved back into the cylinder is directed from the horizontal direction toward the direction of the common rotary shaft.

For the conventional heavy article inversion device, however, the pair of cam plates each having the curved lower outer circumferential surface extending from the proximal end side toward the radial outside end must be larger, and the curvature radius of the curve must be larger accordingly.

The stroke of the respective rod being moved out of or moved back into the respective cylinder must also be larger accordingly.

For the conventional heavy article inversion device in which the pair of linear drive mechanisms is disposed in the same horizontal plane as the common rotary shaft, and the respective rod is moved out of or moved back into the cylinder from the horizontal direction toward the direction of the common rotary shaft, therefore, its construction must become larger, and it must take a longer time for the inversion to be completed.

For the heavy article inversion device of the present invention, in contrast, the pair of linear drive mechanism may be operated to cause the respective rod to be moved out of or moved back into the cylinder from the obliquely downward direction toward the direction of the common rotary shaft. Thus, the pair of cam plates each having the curved lower outer circumferential surface extending from the proximal end side toward the radial outside end can be provided to have the smaller size and the curve can be provided to have the smaller curvature radius, as compared with the conventional pair of cam plates. The stroke of the respective rod being moved out of or moved back into the cylinder can become smaller accordingly.

In accordance with the heavy article inversion device can be built to have the reduced-size construction, and permits the article or work supported by the pair of inversion boards to be revolved by the angle of 180 degrees and transferred from one inversion board to the other inversion board smoothly and in the reduced time.

In the heavy article inversion device of the present invention that has been described above, it is preferred that the curved lower outer circumferential surface that will be engaged by the tip end of the respective rod while the pair of inversion boards is being revolved over the predetermined angular range across the vertical line passing through the common rotary shaft should be formed like the involute curve.

The inversion of a heavy article (which will be referred to as the "work") by the heavy article inversion device of the present invention may be performed in the following sequence.

A work that is to be inverted by the angle of 180 degrees will be placed on one of the pair of inversion boards (which may be assigned as the supplier-side inversion board, for example) that is now placed in its horizontal state.

Then, the supplier-side inversion board will be revolved about the common rotary shaft until it reaches the position within the predetermined angular range from the vertical line passing the common rotary shaft toward the side on which the supplier-side inversion board is disposed.

In the meantime, the other inversion board (which may be assigned as the receiver-side inversion board, for example) will be revolved about the common rotary shaft in the direction opposite that of the supplier-side inversion board, with the work being held securely between the receiver-side inversion board and the supplier-side inversion board when the supplier-side inversion board has been revolved until it reaches the respective position within the predetermined angular range from the vertical line passing the common rotary shaft.

With the work being held securely between the receiver-side and supplier-side inversion boards, on the other hand, the receiver-side inversion board may then be revolved about the common rotary shaft until it reaches the respective position within the predetermined angular range from the vertical line passing through the common rotary shaft toward the side on which the receiver-side inversion board is disposed.

When the work has been transferred to the receiver-side inversion board and held by it, the receiver-side inversion board may be revolved about the common rotary shaft until it is placed in its horizontal state.

In this way, the work may be inverted by the angle of 180 degrees.

When the supplier-side inversion board and receiver-side inversion board are to be revolved together about the common rotary shaft over the predetermined angular range while the heavy work is held securely between the supplier-side and receiver-side inversion board, it is preferred that those two inversion boards should be revolved synchronously with each other. Specifically, in order to permit the heavy work to be held securely and revolved by the pair of supplier-side and receiver-side inversion boards, it is preferred that the supplier-side and receiver-side inversion boards should be revolved synchronously with each other between the particular angular range from the vertical line passing through the common rotary shaft toward the side on which the supplier-side inversion board is disposed and the particular angular range from the vertical line passing through the common rotary shaft toward the side on which the receiver-side inversion board is disposed.

In accordance with the heavy article inversion device of the present invention, the curved lower outer circumferential surface that will be engaged by the tip end of the respective rod while the pair of inversion boards is being revolved over the particular angular range across the vertical line passing through the common rotary shaft 4 may be formed like the involute curve. The range over which the pair of inversion boards is revolved over the particular angular range across the vertical line passing through the common rotary shaft 4 may also be made to correspond to between the particular angular range from the vertical line passing through the common rotary shaft toward the side on which the supplier-side inversion board is disposed and the particular angular range from the vertical line passing through the common rotary shaft toward the side on which the receiver-side inversion board is disposed, as described above. In this way, the supplier-side inversion board and receiver-side inversion board can be revolved synchronously with each other while they are being revolved. While the supplier-side inversion board and receiver-side inversion board are being revolved about the common rotary shaft, with the work being held between the two inversion boards, the heavy work in particular can be held securely between the two inversion boards.

For the pair of linear drive mechanisms, the linear drive mechanism including the hydraulic fluid- or oil-operated cylinder or the electric power power-operated cylinder may be employed. From the viewpoint of the integrated control, the hydraulic mechanism with the automatic control functions may be employed.

The heavy article inversion device in accordance with the present invention provides several advantages in that the physical size can be reduced, and the individual articles such as the heavy works in particular can be inverted by 180 degrees smoothly and efficiently. In addition, the time required for this inversion can be reduced.

BEST MODE OF EMBODYING THE INVENTION

The heavy article inversion device according to the preferred embodiment of the present invention is now described by referring to the accompanying drawings.

Figure 1:
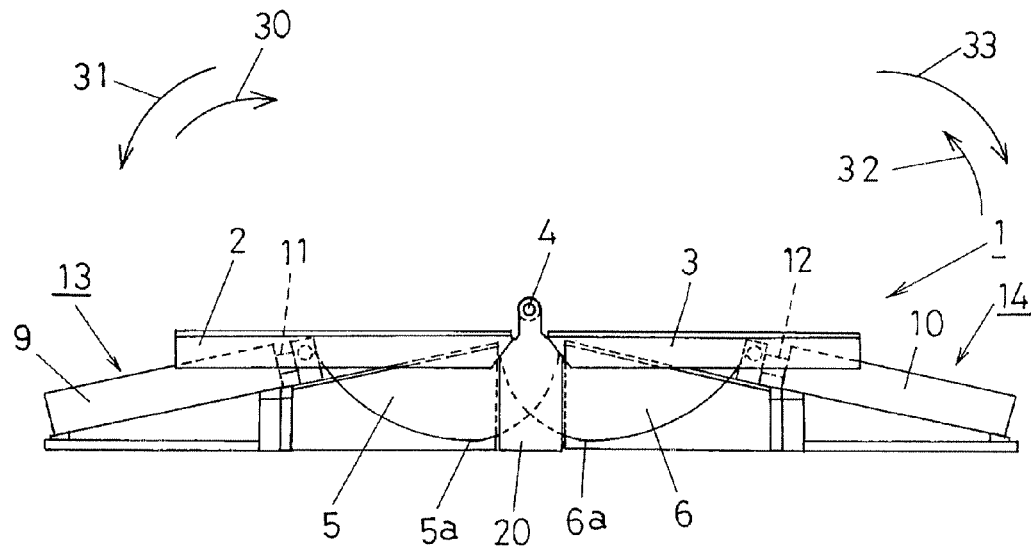
FIG. 1 is a front view of the heavy article inversion device according to one embodiment of the present invention although some parts are not shown for the clarity of the drawing.

In the embodiment shown in FIG. 1, the heavy article inversion device 1 includes a base 20 and a pair of inversion boards 2, 3, each of which is capable of being revolved about a common rotary shaft 4 supported in the center of the base 20 between its horizontal state and the angle of revolution of less than 180 degrees from the horizontal state.

A pair of cam plates 5, 6 is also provided so that each of the cam plates 5, 6 is fixed to each respective one of the inversion boards 2, 3.

As shown in FIG. 1, each of the cam plates 5, 6 has its proximal end side rotatably mounted to the common rotary shaft 4, and has its lower outer circumferential surface extending from the proximal end side toward the radial outside end that is formed like a curve.

The heavy article inversion device 1 further includes a pair of linear drive mechanisms 13, 14 that are disposed on the radial outside end of the base 20 (on the opposite sides of the base 20 in the example shown in FIG. 1), and are arranged across the common rotary shaft 20 such that they face opposite each other.

In the embodiment shown in FIG. 1, each one of the pair of linear drive mechanisms 13, 14 includes a cylinder 9, 10, and a rod 11, 12, in which the rod 11, 12 may be operated to be moved out of and moved back into the respective cylinder 9, 10.

Each of the rods 11, 12 has any suitable rotating means such as a roller, cam follower and the like fixed to its tip end. When the rod 11, 12 is moved back into the respective cylinder 9, 12 as shown in FIG. 1, the tip end of the rod 11, 12 will come into engagement with the curved lower outer circumferential surface on the radial outside end of the respective cam plate 5, 6, thus causing the corresponding inversion board 2, 3 to be placed in its horizontal state.

Each one of the pair of linear drive mechanisms 13, 14 may be operated to cause the respective cam plate 5, 6 to rotate about the common rotary shaft 4 in the direction of arrows 30, 31 or in the direction of arrows 32, 33, respectively.

More specifically, one of the pair of linear drive mechanisms such as 13, for example, may be operated in the following manner. That is, the linear drive mechanism 13 may be operated to cause the rod 11 to be moved out of the cylinder 9 with the tip end of the rod 11 engaging the curved lower outer circumferential surface of the cam plate 5, thus causing the cam plate 5 to rotate about the common rotary shaft 4 in the direction of an arrow 30. The linear drive mechanism 13 may also be operated to cause the rod 11 to be moved back into the cylinder 9 with the tip end of the rod 11 engaging the curved outer circumferential surface of the cam plate 5, thus causing the cam plate 5 to rotate about the common rotary shaft 4 in the direction of an arrow 31. In this way, the corresponding inversion board 2 mounted to the cam plate 5 may be revolved about the common rotary shaft between its horizontal state as shown in FIG. 1 and the angles of revolution of more than 90 degrees and less than 180 degrees from the horizontal state.

Similarly, the other one of the pair of linear drive mechanism such as 14, for example, may be operated in the following manner. That is, the linear drive mechanism 14 may be operated to cause the rod 12 to be moved out of the cylinder 10 with the tip end of the rod 12 engaging the curved lower outer circumferential surface of the cam plate 6, thus causing the cam plate 6 to rotate about the common rotary shaft 4 in the direction of an arrow 32. The linear drive mechanism 14 may also be operated to cause the rod 12 to be moving into the cylinder 10 with the tip end of the rod 12 engaging the curved outer circumferential surface of the cam plate 6, thus causing the cam plate 6 to rotate about the common rotary shaft 4 in the direction of an arrow 33. In this way, the corresponding inversion board 3 mounted to the cam plate 6 may be revolved about the common rotary shaft between its horizontal state as shown in FIG. 1 and the angles of revolution of more than 90 degrees and less than 180 degrees from the horizontal state.

In accordance with the heavy article inversion device 1 of the present invention, it should be noted that the direction in which the rods 11, 12 of the linear drive mechanisms 13, 14 may be operated to be moved out of and moved back into the respective cylinders 9, 10 occurs from the obliquely downward direction toward the direction of the common rotary shaft 4 as shown in FIG. 1.

The range of the curved lower outer circumferential surface of the cam plate 5, 6 as designated by 5a, 6a in FIG. 1 may be formed like the involute curve.

The range designated by 5a, 6a in FIG. 1 corresponds to the curved lower outer circumferential surface of the cam plate 5, 6 that will be engaged by the tip end of the rod 11, 12 while the inversion operation proceeds from the step in FIG. 3(d) to the step in FIG. 4(b), which will be described later.

The heavy article inversion drive of the present invention further includes a pair of inversion board restoring drive mechanisms, one of which is assigned to one of the pair of inversion boards such as 2, for example, and the other is assigned to the other one of the pair of inversion board such as 3, for example.

Figure 2:
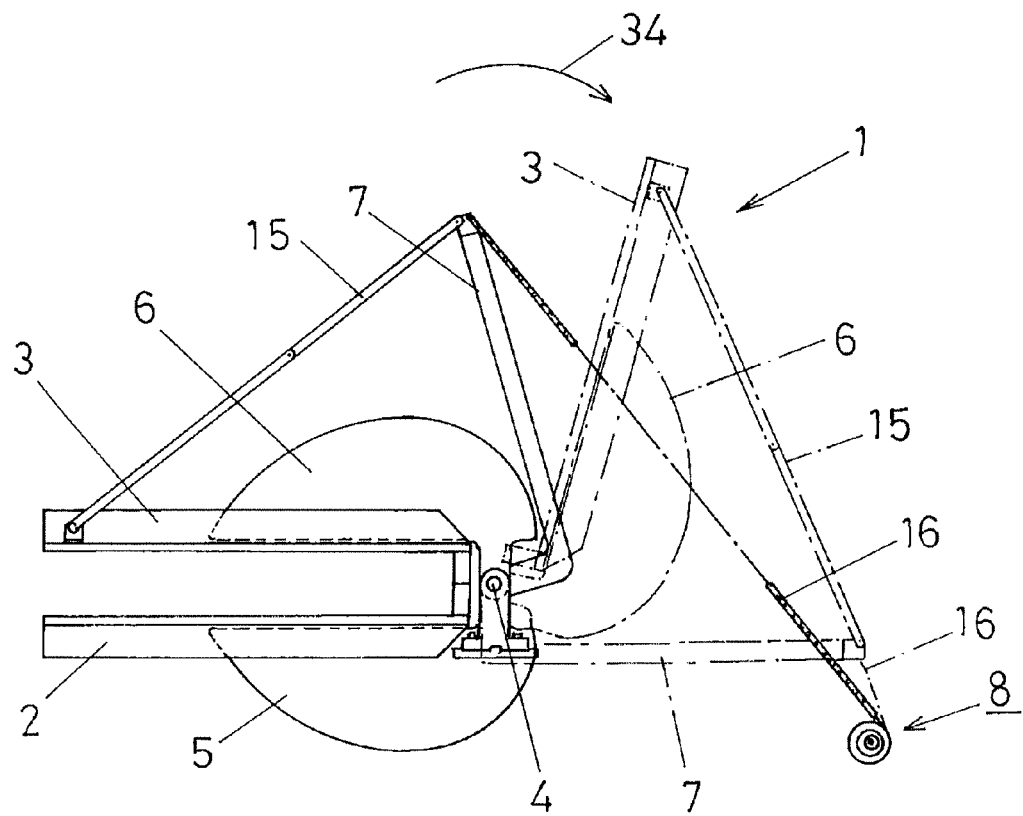
FIG. 2 is a front view of the inversion board restoring drive mechanism in the heavy article inversion device according to one embodiment of the present invention, and serves to explain the operation of the inversion board restoring drive mechanism.

As shown in FIG. 2, the inversion board restoring drive mechanism for the inversion board 3, for example, includes a link arm 15 whose tip end is fixed to the radial outside end of the inversion board 3, a chain 16, and a winding mechanism 8 disposed on the proximal end side of the chain 16 and operated to wind up the chain 16.

In the embodiment shown and described, it may be seen from FIG. 2 that the proximal end side of the link arm 15 is rotatably mounted to the radial outside end of an intermediate rotating member 7 which is mounted so that it can rotate about the common rotary shaft 4, and the tip end of the chain 16 is also fixed to the radial outside end of the intermediate rotating member 7.

Figure 4A:
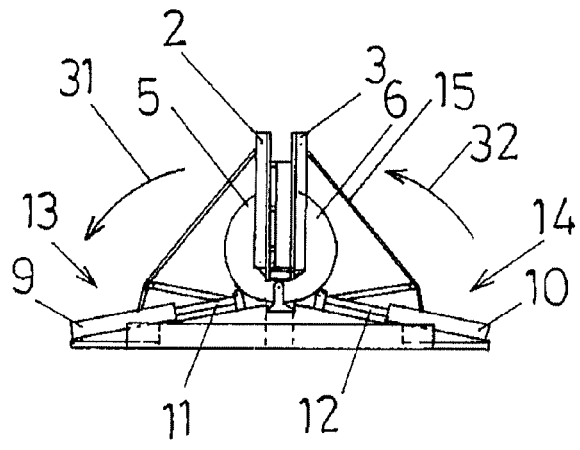
FIG. 4 is a front view of the heavy article inversion device according to one embodiment of the present invention, and serves to explain how the device is operated through the angles of 180 degrees, between the time when the device begins to cause the work to be inverted and the time when the device completes the work inversion, in which (*a*) shows the state corresponding to the state (*f*) in FIG. 3 in which the work begins to be inverted, (*b*) shows the state in which the work is being inverted, (*c*) shows the state in which the work has been inverted completely, (*d*) and (*e*) show the state in which the supplier-side inversion board (the inversion board on the right side in FIG. 4) is being moved back to its initial position, (*f*) shows the state in which the work inversion has been completed by causing the supplier-side inversion board (the inversion board on the right side in FIG. 4) to be moved back to its initial position, and then the gap adjustment on the receiver-side inversion board (the inversion board on the left in FIG. 4) has been released.
Figure 4D:
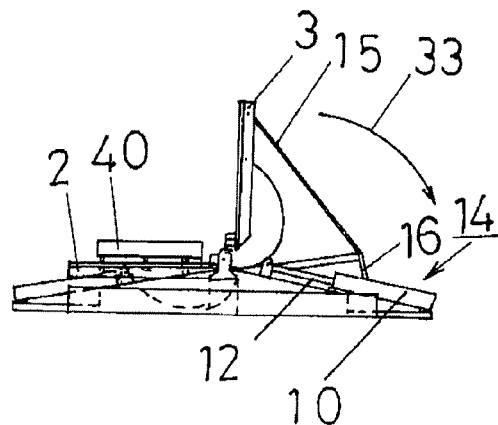

In the state shown in FIG. 4(c) in which the inversion operation is completed as described later, the winding mechanism 8 may be operated to wind the chain 16 up, causing the inversion board 3 to be revolved about the common rotary shaft 4 in the direction of an arrow 34 in FIG. 2 so that the inversion board 3 can be moved back to the state as shown in dot-dash lines in FIG. 2 and then back to the state as shown in FIG. 1.

Although the detailed description is not provided, the inversion board restoring drive mechanism for the inversion board 2 has the same construction as the one for the inversion board 3 that has been described above.

The operation of the heavy article inversion device 1 of the present invention will now be described by referring to FIGS. 3 and 4. During this operation, a heavy article or work may be inverted by the angle of 180 degrees.

Figure 3A:
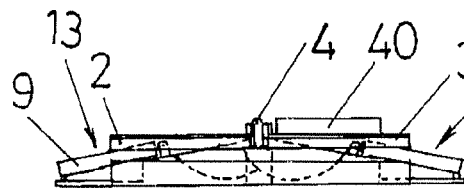
FIG. 3 is a front view of the heavy article inversion device according to one embodiment of the present invention, and serves to explain how the device will be operated through the angles of 180 degrees, between the time when the device is initially started up and the time when the device begins to cause the article or work to be inverted in which (*a*) shows the state in which the work is initially placed on the supplier-side inversion board (the inversion board on the right side in FIG. 3), (*b*) and (*c*) show the state in which the supplier-side and receiver-side inversion boards are both being revolved, (*d*) shows the state in which the supplier-side inversion board (the inversion board on the right side in FIG. 3) stops being revolved while the receiver-side inversion board (the inversion board on the left side in FIG. 3) is still being revolved, (*e*) shows the state in which the gap between the supplier-side and receiver-side inversion boards in which the work is held is being adjusted, and (*f*) shows the state in which the inversion operation is started.

A heavy article or work 40 will be placed on the supplier-side inversion board 3 that is now placed in its horizontal state (FIG. 3(a)).

The linear drive mechanism 14 for the supplied-side inversion board 3 is first described. The linear drive mechanism 14 may then be operated so that its rod 12 can be moved out of the cylinder 10 with the tip end of the rod 12 engaging the curved lower outer circumferential surface on the radial outside end of the cam plate 6.

Figure 3D:
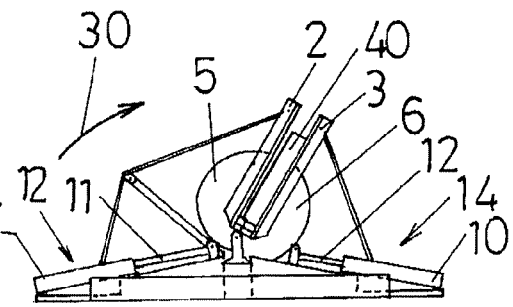
Figure 3B:
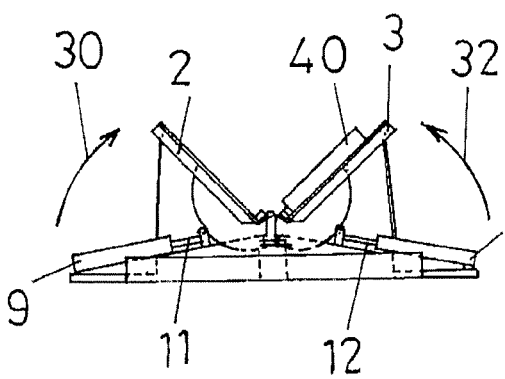

This will cause the supplier-side inversion board 3 to be revolved about the common rotary shaft in the direction of an arrow 32 as shown in FIG. 3(b), with the work 40 being supported by the inversion board 3.

At this moment, the linear drive mechanism 13 for the receiver-side inversion board 2 may also be operated so that its rod 11 can be moved out of the cylinder 9 with the tip end of the rod 11 engaging the lower outer circumferential surface on the radial outside end, causing the inversion board 2 to be revolved about the common rotary shaft 4 in the direction of an arrow 30 as shown in FIGS. 3(b) and (c).

Figure 3E:
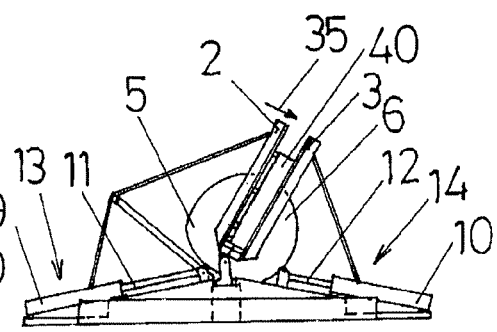
Figure 3C:
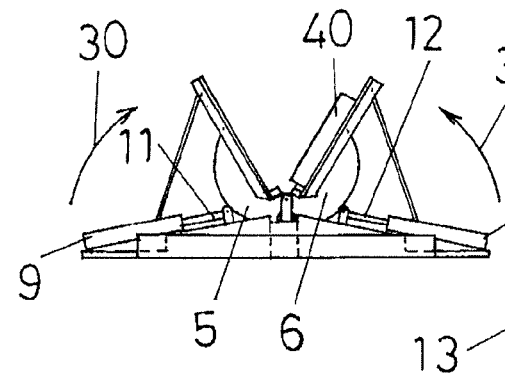

In order to avoid that the work 40 supported on the supplier-side inversion board 3 will drop from the inversion board 3 in the obliquely downward direction when the inversion board 3 is revolved until the angle shown in FIG. 3(c), the revolution of the inversion board 3 may be stopped at that angle, while the receiver-side inversion board 2 may continue to be revolved in the direction of an arrow 30.

Then, the gap between the receiver-side inversion board 2 and supplier-side inversion board 3 may be adjusted by causing the gap adjustment mechanism disposed on the upper side of the receiver-side inversion board 2 to project from the upper side of the inversion board 2 in the direction of an arrow 2, so that the work 40 can be held securely between the receiver-side and supplier-side inversion boards 2, 3 (FIG. 3(e)).

Figure 3F:
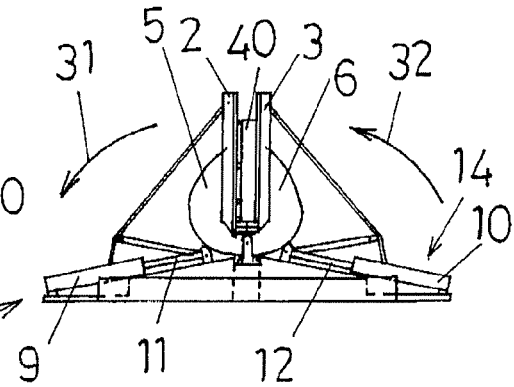

Then, the linear drive mechanism 14 may be operated to cause its rod 12 to be moved out of the cylinder 10, while synchronously with the action of the linear drive mechanism 14, the linear drive mechanism 13 may be operated to cause its rod 11 to be moved back into the cylinder 9. This may cause the receiver-side inversion board 2 and supplier-side inversion board 3 to be revolved synchronously with each other in the respective directions of arrows 31, 32, with the work 40 being held securely between the receiver-side inversion board 2 and supplier-side inversion board 3. FIG. 3(f) and FIG. 4(a) show that the receiver-side inversion board 2 and supplier-side inversion board 3 have been placed in their respective vertical states after the above revolution.

Figure 4B:
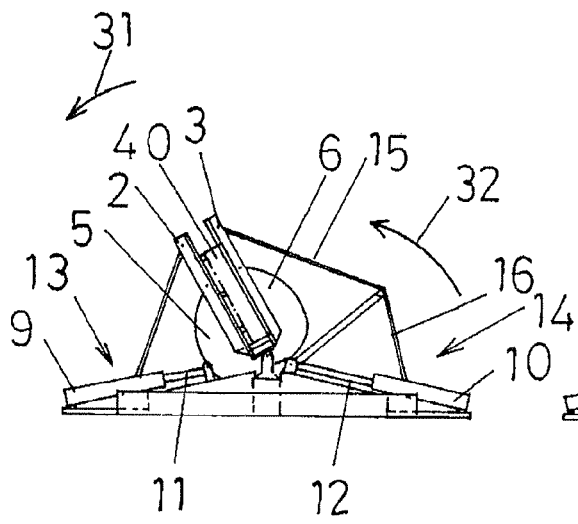
Figure 4E:
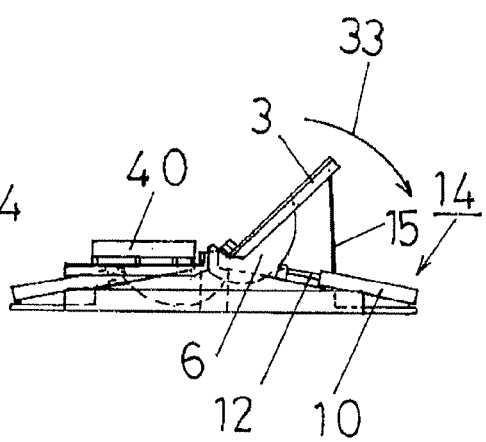
Figure 4C:
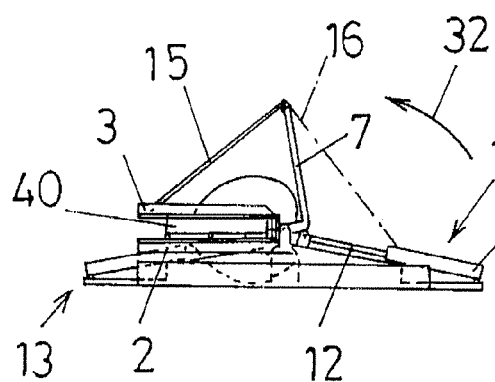

Then, with the work 40 being held securely between the receiver-side inversion board 2 and supplier-side inversion board 3, the receiver-side inversion board 2 and supplier-side inversion board 3 may be revolved synchronously with each other in the respective directions of arrows 31, 32, until they reach the respective states as shown in FIG. 4(b).

When the angle at which the receiver-side inversion board 2 is inclined comes to the state as shown in FIG. 4(b), the risk of the work 40 dropping toward the oblique downward direction can be avoided. Subsequently, the linear drive mechanism 13 can be operated to cause the rod 11 to continue to be moved back into the cylinder 9 without having to force the supplier-side inversion board 3 to be revolved in the direction of an arrow 32. This permits the receiver-side inversion board 2 to be revolved in the direction of an arrow 31 with the work 40 being supported on the receiver-side inversion board 2. As the receiver-side inversion board 2 is being revolved, the supplier-side inversion board 3 can also be revolved. In this way, the inversion operation can be completed as shown in FIG. 4(c).

Then, the supplier-side inversion board 3 may be raised as shown in FIG. 4(d) by causing the winding mechanism 8 to wind the chain 16 up. When the tip end of the rod 12 is made to engage the curved lower outer circumferential surface on the radial outside end of the cam plate 6, the linear drive mechanism 14 may be operated to cause the rod 12 to be moved back into the cylinder 10 with the same speed at which the inversion board 3 is being revolved in the direction of an arrow 33 by causing the winding mechanism 8 to wind the chain 16 up (FIG. 4(e)).

Figure 4F:
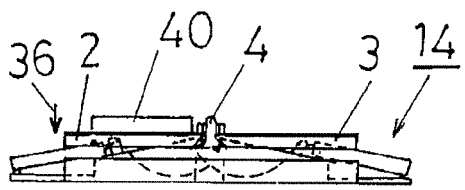

When the supplier-side inversion board 3 is thus restored to the state as shown in FIG. 3(a), the gap adjusting mechanism disposed on the upper side of the receiver-side inversion board 2 may be moved in the direction of an arrow 36 so that it can be placed back into the upper side, permitting the work 40 to be transferred onto the receiver-side inversion board 2 (FIG. 4(f)).

In the embodiment shown and described, the curved lower outer circumferential surface of the respective cam plate 5, 6 which will be engaged by the tip end of the respective rod 11, 12 while the inverting process proceeds from the step shown in FIG. 3(d) to the step shown in FIG. 4(b) (the range as designated by 5a, 6a in FIG. 1) may be formed like the involute curve. More specifically, the curved lower outer circumferential surface of the respective cam plate 5, 6 which may be engaged by the tip end of the respective rod 11, 12 may be formed like the involute curve while the inversion boards 2, 3 are being revolved through the predetermined angular range across the vertical line passing through the common rotary shaft 4 through which the inversion boards 2, 3 pass (in the embodiment shown, the angular range of 60 degrees across the vertical line passing through the common rotary shaft 4).

The angular range across the vertical line passing through the common rotary shaft 4 through which the inversion boards 2, 3 may pass and over which the inversion boards 2, 3 are being revolved may be made to correspond to the intermediate angular range between the angular range (in the embodiment shown, the angular range of 30 degrees) from the vertical line passing through the common rotary shaft 4 toward the side (right side in the figure) on which the supplier-side inversion board 3 is disposed and the angular range (in the embodiment shown, the angular range of 30 degrees) from the vertical line passing through the rotary shaft 4 toward the side (left side in the figure) on which the receiver-side inversion board 2 is disposed. In this way, the curved lower outer circumferential surface of the respective cam plate 5, 6 which may be engaged by the tip end of the respective rod 11, 12 while the inversion boards 2, 3 are being revolved from the step in FIG. 3(d) to the step in FIG. 4(b) can be formed like the involute curve as designated by 5a, 6a in FIG. 1.

This permits the supplier-side inversion board 3 and the receiver-side inversion board 2 to be revolved smoothly in synchronism with each other.

This also permits the supplier-side inversion board 3 and the receiver-side inversion board 3 to be revolved about the common rotary shaft 2 with the heavy work being held securely between the pair of inversion boards 3 and 2.

Although the particular preferred embodiment of the present invention has been described above by referring to the accompanying drawings, it should be understood that the present invention is not limited to the particular embodiment described above, which may be modified in numerous ways without departing from the spirit and scope of the invention as defined in the appended claims.

What is claimed is:

1. A heavy article inversion device including:
   a base;
   a pair of inversion boards, each being capable of being revolved rotating between its horizontal state and the angle of revolution of less than 180 degrees from the horizontal state about a common rotary shaft supported in the center of the base;
   a pair of cam plates, each being fixed to each respective one of the pair of inversion boards and having its proximal end side rotatably mounted to the common rotary shaft and having the curved lower outer circumferential surface extending from the proximal end side toward the radial outside end; and
   a pair of linear drive mechanisms mounted on the side of the radial outside end of the base and so arranged on either side of the common rotary shaft therebetween as to face opposite each other, each one of the pair of linear drive mechanism including a cylinder and a rod operatively being moved out of and moved back into the corresponding cylinder,
   each one of the pair of linear drive mechanisms being operated to:
   cause the tip side of the respective rod to engage the curved lower outer circumferential surface on the radial outside end of the respective cam plate when the rod is moved back into the corresponding cylinder so that the corresponding inversion board can be placed in its horizontal state, and
   cause the respective rod to be moved out of and moved back into the corresponding cylinder with the tip side of the rod being made to engage the curved lower outer circumferential surface of the respective cam plate, thereby causing the respective cam plate to rotate about the common rotary shaft so that each one of the pair of inversion boards each fixed to the corresponding cam plate can be revolved about the common rotary shaft between its horizontal state and the angle of revolution of more than 90 degrees and less than 180 degrees from the horizontal state, wherein
   the heavy article inversion device further includes:
   a pair of inversion board restoring drive mechanisms, each having its tip side fixed to the radial outside end of the corresponding inversion board and having its proximal end side fixed to the radial outside end of the base, each one of the pair of inversion board restoring drive mechanisms being operated to cause the respective rod of the linear drive mechanism to be moved out of and moved back into the corresponding cylinder from the obliquely downward direction toward the direction of the common rotary shaft.

2. The heavy article inversion drive according to claim 1, wherein
   the curved lower outer circumferential surface of the cam plate that is to be engaged by the tip side of the respective rod while each one of the pair of inversion boards is being revolved about the common rotary shaft within the predetermined angle range with regard to the vertical line passing through the common rotary shaft is formed like the involute curve.

* * * * *